No. 750,099. PATENTED JAN. 19, 1904.
H. L. DE ZENG & P. S. REID.
OPHTHALMOSCOPE.
APPLICATION FILED OCT. 6, 1903.
NO MODEL.
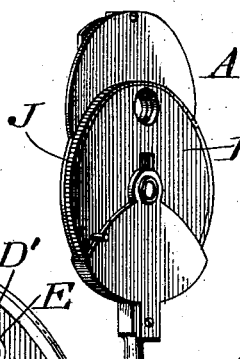
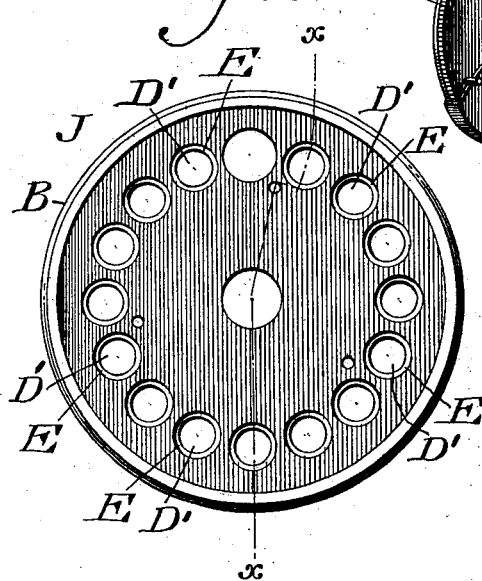
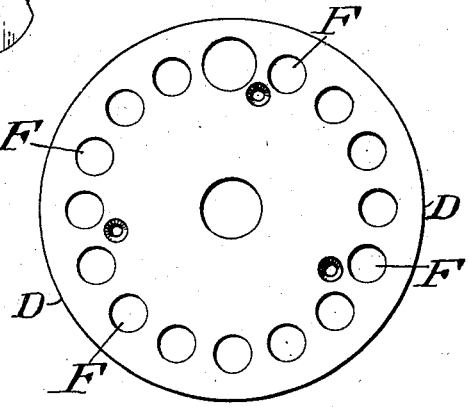
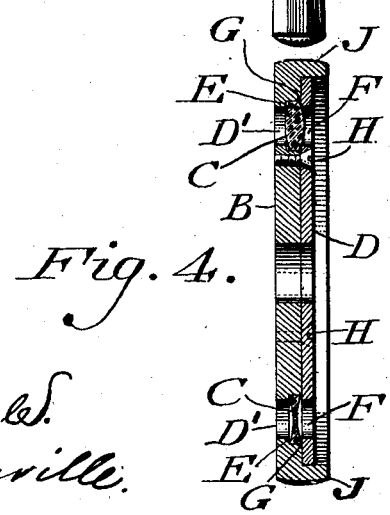
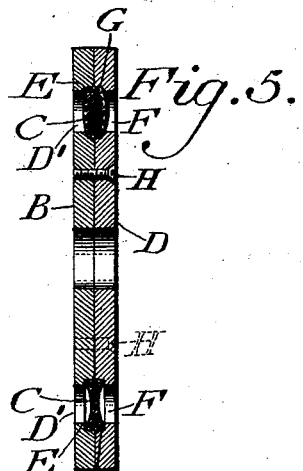

No. 750,099.

Patented January 19, 1904.

UNITED STATES PATENT OFFICE.

HENRY L. DE ZENG, OF PHILADELPHIA, PENNSYLVANIA, AND PHILIP S. REID, OF HAMMONTON, NEW JERSEY.

OPHTHALMOSCOPE.

SPECIFICATION forming part of Letters Patent No. 750,099, dated January 19, 1904.

Application filed October 6, 1903. Serial No. 175,918. (No model.)

*To all whom it may concern:*

Be it known that we, HENRY L. DE ZENG, residing in the city and county of Philadelphia, State of Pennsylvania, and PHILIP S. REID, residing at Hammonton, in the county of Atlantic, State of New Jersey, citizens of the United States, have invented new and useful Improvements in Ophthalmoscopes, of which the following is a specification.

Our invention relates to improvements in an ophthalmoscope; and it consists of novel means for securing or holding the lenses thereof in position, as will be hereinafter described, and pointed out in the claims.

Figure 1 represents a perspective view of an ophthalmoscope embodying our invention. Figs. 2 and 3 represent face views of detached portions thereof on an enlarged scale. Fig. 4 represents a section on line $x\ x$, Fig. 1, including a similar section of Fig. 3 and the lenses in position on the two disks. Fig. 5 represents a section of a modification.

Similar letters of reference indicate corresponding parts in the figures.

Referring to the drawings, A designates an ophthalmoscope which, excepting the feature of our invention applied thereto, is of usual construction.

B designates the main disk of the instrument, C the lenses thereon, and D the retaining-disk for said lenses, it being noticed that said lenses extend in circular order entirely around the disk B. The walls of the openings D' in the main disk B, which receives said lenses, have shoulders E thereon, the same being of less diameter than those of the lenses and having the latter seated thereon.

The openings F in the retaining-disk D are of less diameter than those of the lenses and the adjacent portions of the openings D', thus forming the shoulders G, which bear against the lenses on the face opposite to the shoulders E, it being seen that the lenses, while occupying the openings D', are embraced by the opposite shoulders E and G.

Screws H are passed through the disks B and D, thus connecting the same and firmly retaining the disks between them, as most plainly shown in Fig. 4, it being evident that when the screws H are properly rotated the disk D may be removed, whereby access may be had to the lenses for displacement of the same.

It will be noticed that when the parts are in position, as in Fig. 4, the heads of the screws appear on the outer face of the disk D, whereby when the instrument is laid down on the disk B and the disk D is removed the lenses will remain on said disk B without liability to drop or roll off the same.

The disk B is formed or otherwise provided with a peripheral rim J, which encircles the periphery of the disk D and is properly milled, so that the disk B may be conveniently rotated, it being evident that the two disks B D rotate as one.

The rim J is extended sufficiently laterally as to inclose the rotatable auxiliary disk K, whose motion is independent of the disks B D.

In Fig. 5 we show two disks or plates of the same construction, or they may be of substantially the same construction in that the inner faces of each disk or plate are formed with similar shouldered or recessed openings or cells.

Having thus described our invention, what we claim as new, and desire to secure by Letters Patent, is—

1. In an ophthalmoscope, a main disk, a retaining-disk and a series of lenses, said disks having a series of openings in which said lenses appear and means connecting said disks as one, the openings in one disk having shoulders on which said lenses are seated and said retaining-disk having its openings of less diameters than those of the lenses.

2. In an ophthalmoscope, a pair of disks, a series of lenses, said disks having a series of openings in which said lenses appear, and shoulders upon which said lenses are rested and clamped.

HENRY L. DE ZENG.
PHILIP S. REID.

Witnesses:
JOHN A. WIEDERSHEIM,
S. R. CARR.